United States Patent [19]

Mori et al.

[11] Patent Number: 5,404,415
[45] Date of Patent: Apr. 4, 1995

[54] OPTICAL FIBER COUPLER AND METHOD FOR PREPARING SAME

[75] Inventors: Tsuneo Mori; Kazuo Koya, both of Gunma, Japan

[73] Assignee: Shin-Etsu Chemical Co., Ltd., Tokyo, Japan

[21] Appl. No.: 186,296

[22] Filed: Jan. 25, 1994

[30] Foreign Application Priority Data

Jan. 27, 1993 [JP] Japan .................. 5-011942

[51] Int. Cl.⁶ ............................... G02B 6/26
[52] U.S. Cl. ........................ 385/43; 385/51
[58] Field of Search ............ 385/15, 39, 42, 43, 385/46, 48, 50, 51

[56] References Cited

U.S. PATENT DOCUMENTS

| | | | |
|---|---|---|---|
| 4,822,128 | 4/1989 | Imoto et al. | 385/43 |
| 5,009,478 | 4/1991 | Sasaki et al. | 385/39 |
| 5,208,883 | 5/1993 | Hattori et al. | 385/43 |
| 5,309,536 | 5/1994 | Suganuma et al. | 385/43 |

FOREIGN PATENT DOCUMENTS 2-220008  9/1990  Japan .

*Primary Examiner*—John D. Lee
*Attorney, Agent, or Firm*—McAulay Fisher Nissan Goldberg & Kiel

[57] ABSTRACT

In an optical fiber coupler comprising a plurality of optical fibers bundled together and a light-coupling portion which is formed by partially fusing and drawing these bundled fibers and which permits branching of light rays incident upon one of these fibers into the other fibers at a predetermined branching ratio, the optical fiber coupler has a difference between the branching ratio thereof determined immediately after the fusing and drawing operation and that determined after accommodating the coupler in a protective case and then adhering it to the case, equal to or less than 5%. Such an optical fiber coupler can be produced by bundling a plurality of optical fibers 1 and 2, fusing and drawing a part of the bundled optical fibers with heating, fixing the relative positions of these optical fibers 1 and 2 immediately after the fusing and drawing operation and then accommodating in and fixing to a protective case. If the foregoing difference in the branching ratio is not more than 5%, the difference between the branching ratios determined after the fusing and drawing operation and determined after the coupler is subjected to a thermal shock test is reduced to a level of not more than 2%. Therefore, the coupler does not suffer from any substantial change in properties even after the thermal shock test and thus can practically be used with high reliability.

6 Claims, 3 Drawing Sheets

OPTICAL FIBER COUPLER AND METHOD FOR PREPARING SAME

BACKGROUND OF THE INVENTION

The present invention relates to an optical fiber coupler which can be used in optical communication systems and optical sensors.

The optical fiber communication system makes use of an optical fiber coupler as an important element or part for separating and coupling, or branching and multiplexing light. In particular, an optical fiber coupler produced by processing optical fibers has widely been used in various fields, because of its excellent ability of being coupled with an optical fiber and a low propagation loss.

As will be seen from FIG. 1, an optical fiber coupler 10 comprises a plurality (two fibers are shown in this figure) of single mode optical fibers 1 and 2 and a light-coupling portion 11 formed by partially fusing, under drawing conditions, these optical fibers 1 and 2. Light rays incident upon one of these plurality of optical fibers are thus branched into the other optical fibers in a predetermined branching ratio.

FIG. 2 is a diagram showing main part Of a method for producing the optical fiber coupler 10. Protective coating materials 3 are previously removed from the desired portions of these optical fibers 1 and 2 to be fused together and the optical fibers are fixed by clamps 4 and 5 while the exposed portions of the fibers are brought into close contact with one another. The clamps 4 and 5 are connected to a tension mechanism which comprises a threaded bar 22, a guide bar 23 and a driving motor M. These two optical fibers 1 and 2 are fused by heating the contact portion thereof with a flame 6. If the driving motor M is put in operation at this stage, the clamps 4 and 5 each moves towards each corresponding direction indicated by an arrow and accordingly, the optical fibers 1 and 2 are drawn along the axial direction to thus give a tapered light-coupling portion 11. In this respect, the foregoing drawing operation is carried out while monitoring the branching ratio by making light rays emitted from a light source 7 having a desired wave length incident upon the optical fiber 1, detecting the intensity of the light outputted from the fiber 1 by a photodetector 8 and simultaneously detecting the intensity of the light outputted from the fiber 2 by a photodetector 9. When the branching ratio reaches a predetermined level, the driving motor M is interrupted to terminate the drawing operation.

The optical fiber coupler produced by the method discussed above has a very fine tapered light-coupling portion 11 and hence very low mechanical strength. For this reason, the fiber coupler causes axial deflection by the influence of even a weak external force which in turn results in a change of the branching ratio thereof. As a result, the optical fiber coupler exhibits unstable performance characteristics. Thus, the optical fiber coupler is adhered to a fixing stand in order to protect the coupler from the application of any external stress.

The optical fiber coupler of this type should have characteristic properties independent of environments in which the coupler is subsequently used. Japanese Patent Provisional Publication No. 3-107111 discloses a technique for stabilizing the characteristic properties of an optical fiber coupler of this type through the limitation of the Young's modulus of a resin used for the adhesion between the fiber coupler and a fixing container to a specific range. Moreover, Japanese Patent Application Publication No. 4-29046 discloses a technique which comprises supporting an optical fiber coupler on a buffering member and fixing the buffering member to a package at a point through the use of an adhesive.

Parts (including optical fiber couplers) generally used in optical fiber communication system are exposed to severe environmental conditions over a long time period and, therefore, it has been required for these parts to previously perform strict inspection thereof for the quality thereof. In respect of, for instance, tests on temperature change, the variation in properties before and after repeated heating/cooling cycle is limited to a specific range, while the variation in properties before and after application of a thermal shock is also limited to a specific range. Referring now to optical fiber couplers, those exhibiting performance characteristics stable to such a temperature change discussed above can be produced in only a low yield even when the foregoing techniques are adopted.

SUMMARY OF THE INVENTION

The present invention has been developed for solving the aforementioned problems associated with the conventional techniques related to optical fiber couplers and accordingly, it is an object of the present invention to provide an optical fiber coupler which is excellent in weatherability and mechanical strength, exhibits stable performance characteristics and has high reliability as well as a method for producing the same.

The foregoing object of the present invention can be accomplished by providing an optical fiber coupler comprising, as shown in FIG. 1, a plurality of optical fibers 1 and 2 bundled together and a light-coupling portion which is formed by partially fusing and drawing these fibers and which permits branching of light rays incident upon one of these fibers into the other fiber at a predetermined branching ratio, wherein the optical fiber coupler has a difference between the branching ratio thereof determined immediately after the fusion and drawing operation and that determined after accommodating the coupler in a protective case and then adhering it to the case, equal to or less than 5%.

On the other hand, the method for producing an optical fiber coupler according to the present invention comprises, as shown in FIG. 2, the steps of bundling a plurality of optical fibers 1 and 2, optically coupling a part of the bundled optical fibers by fusing and drawing a part thereof with heating and accommodating the product thus obtained in a protective case 14 (see FIGS. 4 and 6), wherein the relative positions of these optical fibers 1 and 2 are fixed immediately after the fusing and drawing operation and then the optical fiber coupler thus fixed is accommodated in the protective case 14.

The fixation of the relative positions of these optical fibers 1 and 2 is specifically carried out, as shown in FIG. 3, by adhering each optical fiber 1 or 2 to a fixing member 15 with an adhesive 16 and then the resulting assembly inclusive of the fixing member 15 is accommodated in the protective case 14.

Alternatively, the fixation of the relative positions of these optical fibers 1 and 2 can likewise be specifically carried out, as shown in FIG. 5, by accommodating the optical fibers 1 and 2 in protective cases 17, 14 while fixing these optical fibers 1 and 2 to temporary jigs 4, 5, 22 and 23, then adhering these fibers 1 and 2 to the protective cases 17, 14 through an adhesive 16 and then unfastening the jigs 22 and 23.

The adhesive 16 should have appropriate hardness, impact absorption ability and flexibility and accordingly preferred are ultraviolet-curing epoxy resins.

DETAILED EXPLANATION OF THE INVENTION

Figure 1:
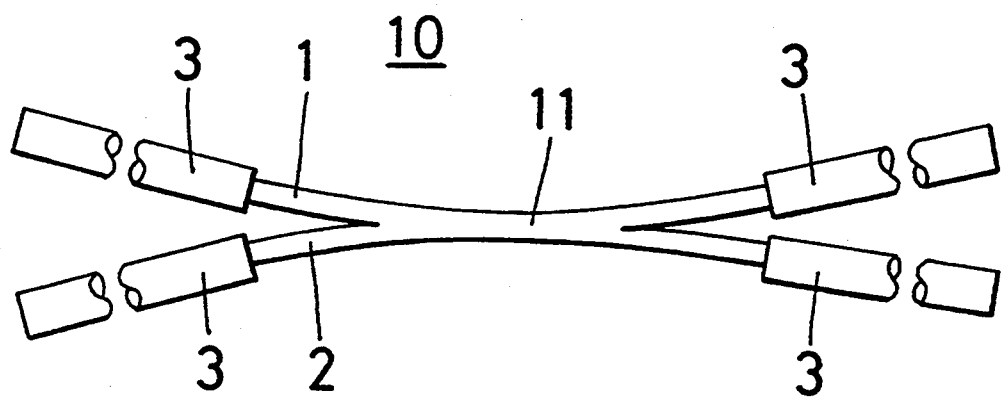
FIG. 1 is an elevational view showing the structure of the optical fiber coupler according to the present invention.

The branching ratio of an optical fiber coupler determined after optically coupling optical fibers through fusion and drawing under heating differs from the ratio of the optical fiber coupler determined after such optical-coupling operation and the subsequent accomodation of the coupler in a protective case 14 because of residual stress due to contraction of an adhesive used for the accommodation. However, if the optical fiber coupler is accommodated in the protective case and adhered thereto and then the resulting assembly is repeatedly subjected to a thermal shock test, the residual stress in the coupler is gradually reduced as the adhesive is repeatedly expanded and contracted and the branching ratio of the coupler returns to the level observed immediately after the optical coupling procedure (the optimum mechanically equilibrated state). The inventors of this invention have inquired into this tendency and have found out that if the difference between the branching ratios of the optical fiber coupler determined immediately after the fusion and drawing operation and determined after accommodating the optical coupler in the protective case and then adhering it to the case is on the order of not more than 5%, the difference between the branching ratios of the coupler determined after the optical coupling and determined after the repeated thermal impact test can be limited to a level of not more than 2%. More specifically, if the difference between the branching ratios of an optical fiber coupler determined immediately after the fusion and drawing operation and determined after accommodating in a protective case and then adhering the coupler to the case can be limited to not more than 5%, as in the case of the optical fiber coupler of the present invention, the difference of not more than 2% can be ensured between the branching ratios of the coupler determined after the thermal impact test and determined immediately after the fusion and drawing (the branching ratio for the optimum mechanically equilibrated state of the coupler). Thus, such a difference in branching ratio falls within the allowable range of errors and the coupler can practically used without any trouble.

Alternatively, the difference between the branching ratios of the foregoing optical fiber coupler determined immediately after the optical coupling and determined after accommodating the coupler in a protective case 14 and adhesion of the coupler to the case can be controlled to not more than 5% by the method comprising the steps of bundling a plurality of optical fibers 1 and 2, optically coupling the fibers through partially fusing and drawing with heating and immediately after the optical coupling step, fixing the relative positions of these optical fibers 1 and 2 and then accommodating the optical fibers coupler in a protective case 14.

Various embodiments of the optical fiber coupler according to the present invention will hereunder be explained in more detail with reference to the accompanying drawings, but the present invention is by no means limited to these specific embodiments.

FIG. 1 is an elevational view showing an embodiment of the optical fiber coupler 10 according to the present invention. The optical fiber coupler 10 is produced by bundling a plurality (two in this embodiment) of single mode optical fibers 1 and 2, fusing and drawing parts of the fibers to give a light-coupling portion 11 and the resulting coupler permits the branching of light rays incident upon one of the plurality of optical fibers into the remaining optical fiber(s) at a predetermined branching ratio. Protective coating material 3 is previously removed from the portions on these optical fibers to be exposed for fusion and drawing (light-coupling portion 11).

Figure 2:
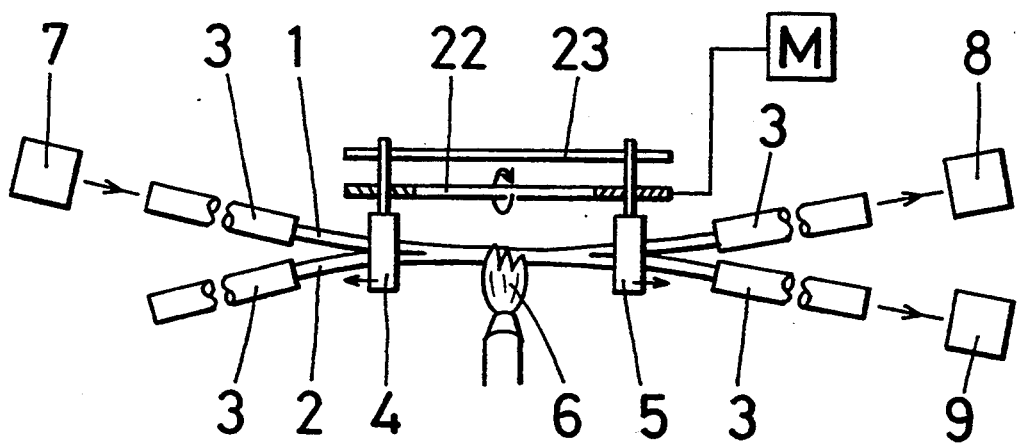
FIG. 2 is a schematic elevational view showing a step of an embodiment of the method for producing an optical fiber coupler according to the present invention.
Figure 3:
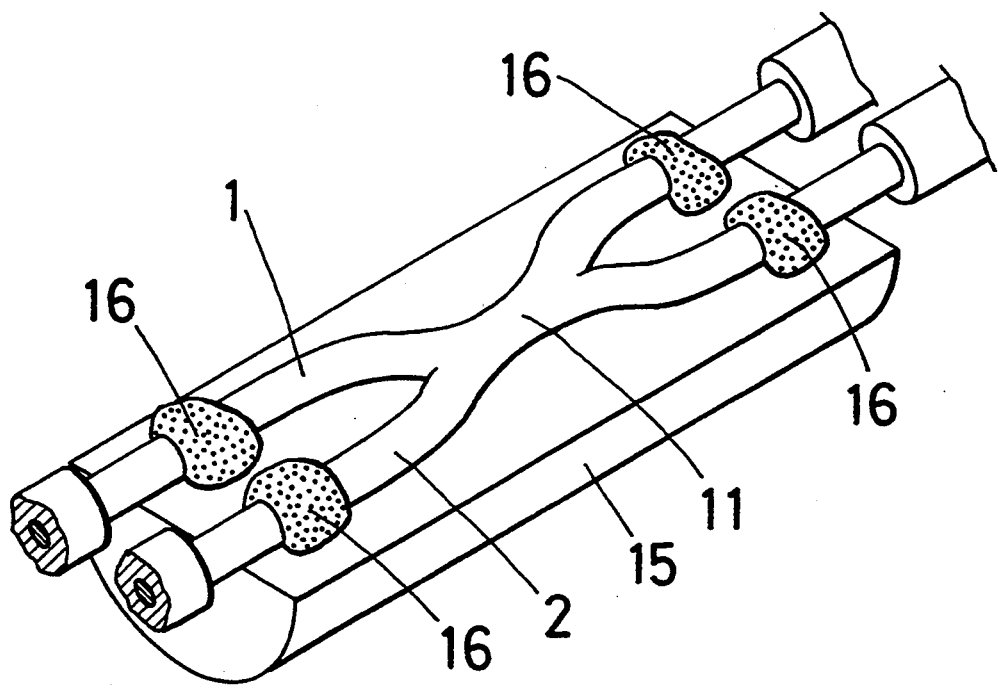
FIG. 3 is a schematic perspective view showing a step of an embodiment of the method for producing an optical fiber coupler according to the present invention.
Figure 4:
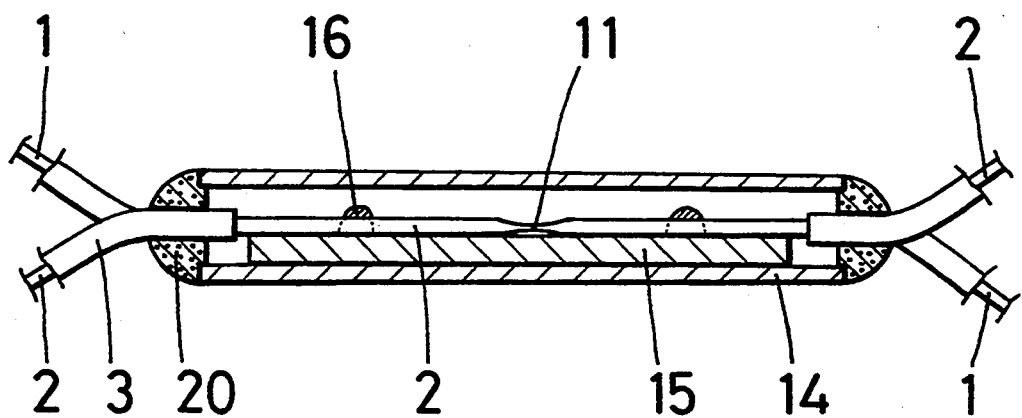
FIG. 4 is a sectional side elevation showing an embodiment of the optical fiber coupler produced according to the method of the present invention.

FIGS. 2 to 4 each shows a step of an embodiment of the method for producing the optical fiber coupler 10 according to the present invention.

As will be seen from FIG. 2, optical fibers 1 and 2 are fitted to an apparatus for fusing and drawing these fibers to give a light-coupling portion of the optical coupler. The apparatus comprises two clamps 4 and 5 for holding the fibers at two different positions thereof and pulling them towards two directions opposed to one another and a burner as a source of an oxyhydrogen flame 6 for heating the optical fibers. The clamps 4 and 5 are connected to a tension mechanism which comprises a threaded bar 22, a guide bar 23 and a driving motor M. The threaded bar 22 is a round rod whose both sides are oppositely threaded and the bar 22 is axially supported by a chassis for the apparatus (not shown). The threaded bar 22 is connected to the driving motor M through a power transmission device. The right-handed screw and the left-handed screw of the threaded bar 22 are screwed in the clamp 4 and the clamp 5 respectively. Moreover, the clamps 4 and 5 are engaged with the guide bar 23 supported by the chassis of the apparatus, in a freely slidable manner. The apparatus further comprises a light source 7 capable of oscillating a laser beam having a desired wave length and detectors 8 and 9 for detecting quantity of light.

The protective coating materials 3 are removed from the portions of the optical fibers 1 and 2 to be fused together, then the fibers are held by the clamps 4 and 5 at two different positions, and the light source 7, the detector 8 and the detector 9 are communicated to the light-incident side of the optical fiber 1, the light-outgoing side of the fiber 1 and the light-outgoing side of the optical fiber 2, respectively. The central portions of the fibers 1 and 2 are converted into a semi-molten state by heating with an oxyhydrogen flame 6. If the driving motor M is put in operation at this stage, the clamps 4 and 5 move towards outward directions opposite to one another. Correspondingly, the fibers 1 and 2 are pulled and the portions of the fibers in the semi-molten state are fused and drawn to thus form a light-coupling portion 11. At this stage, the drawing operation is performed while the amounts of light outputted from the optical fibers 1 and 2 are monitored by the detectors 8 and 9 to thus confirm the branching ratio of the fused and drawn portion (light-coupling portion during forming). As the fusing and drawing processes proceed, the amount of light (quantity of light outputted from the optical fiber 2) detected by the detector 9 increases gradually, while the amount of light (quantity of light outputted from the optical fiber 1) detected by the detector 8 decreases gradually. The driving motor M is stopped and the oxyhydrogen flame 6 is switched off in order to terminate the fusion and drawing operation, at an instance when a desired branching ratio (for instance, a branching ratio of 1:1 observed when the quantity of light detected by the detector 8 is in agreement with the quantity of light detected by the detector 9) is established.

Then the relative positions of the optical fibers 1 and 2 are fixed while the fibers 1 and 2 fused and drawn in the manner discussed above are fitted to the apparatus for fusing and drawing the fibers. The optical fibers 1 and 2 except for the light-coupling portion 11 are adhered to a hemi-circular fixing stand 15 with a UV-curing epoxy resin 16 and then the clamps 4 and 5 are unfastened to thus give an optical fiber coupler fixed and adhered to the fixing stand 15 as shown in FIG. 3.

As will be seen from FIG. 4, the optical fiber coupler fixed and adhered to the fixing stand 15 is accommodated in a cylindrical protective case 14, the fixing stand 15 is adhered to the protective case 14 and further the optical fibers 1 and 2 are fixed to the case 14 at both ends of the case 14 through the use of an adhesive 20 to thus complete the optical fiber coupler.

It has been found that the optical fiber coupler produced by the foregoing processes according to the embodiment shown in FIG. 4 exhibits desired characteristic properties. More specifically, the optical fiber coupler was completed by controlling the branching ratio during the fusion and drawing step shown in FIG. 2 to 1:1 and then treating the resulting coupler according to the processes shown in FIGS. 3 and 4. Then the light source 7, the detector 8 and the detector 9 are again connected to the light-incident side of the optical fiber 1, the light-outgoing side of the fiber 1 and the light-outgoing side of the optical fiber 2, respectively, to determine the branching ratio of the optical fiber coupler. As a result, the difference between the branching ratios thereof determined immediately after the fusing and drawing operation and determined at this stage was found to be 4.2% on the average. Moreover, the optical fiber coupler used in the determination of the branching ratio was again inspected for the branching ratio using the light source 7, the detectors 8 and 9 for detecting the amounts of light after the coupler was subjected to a thermal shock test. As a result, the difference between the branching ratios of the coupler thus determined and determined immediately after the fusion and drawing operation was found to be 1.7% on the average. The foregoing results clearly indicate that the optical fiber coupler produced according to the processes shown in FIGS. 2 to 4 exhibits the difference between the branching ratios of the optical fiber coupler determined immediately after the fusion and drawing operation and determined after accommodation thereof in the protective case 14 and the subsequent adhesion thereto on the order of not more than 5% and that the difference in branching ratios is reduced to a level on the order of not more than 2% after the coupler is subjected to a thermal shock test.

Figure 5:
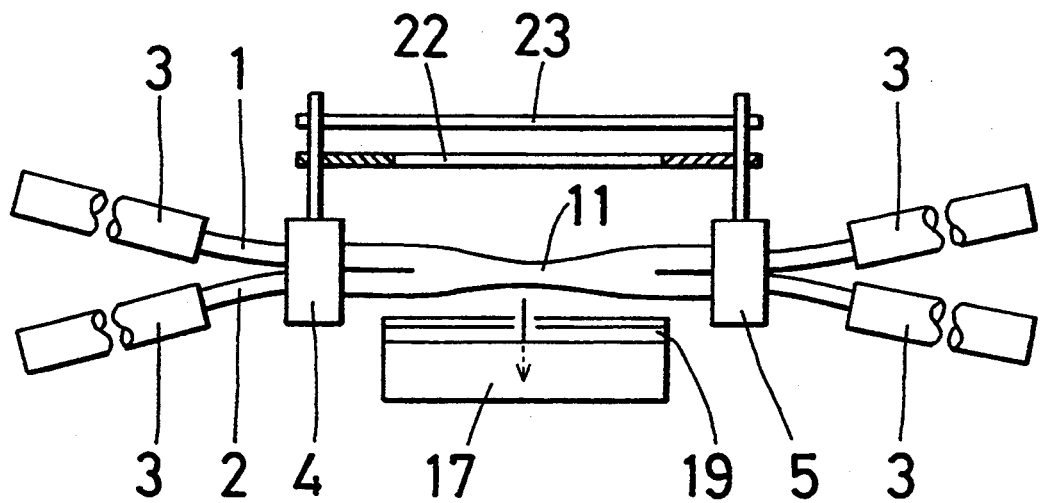
FIG. 5 is a schematic elevational view showing a step of another embodiment of the method for producing an optical fiber coupler according to the present invention.

FIGS. 5 and 6 show another embodiment of the method for producing an optical fiber coupler according to the present invention.

In this embodiment, the process for fusing and drawing a bundle of optical fibers 1 and 2 is identical to that shown in FIG. 2, except that the threaded bar 22 and the guide bar 23 can be detached from the chassis of the apparatus (not shown) together with the clamps 4 and 5. In other words, the clamps 4 and 5, the threaded bar 22 and the guide bar 23 can also serve as a temporary jig for transporting the fused and drawn optical fibers to the subsequent step while fixing the relative positions of the fibers.

The optical fiber coupler comprising the optical fibers 1 and 2 which have been fused and drawn in the step shown in FIG. 2 and held by the clamps 4 and 5 is detached from the chassis of the apparatus together with the threaded bar 22 and the guide bar 23, as shown in FIG. 5, and inserted into a cylinder 17 (see FIG. 6B, a cross sectional view taken along the line A—A in FIG. 6A) having a partially formed notch 19 to thus fix the relative positions of the optical fibers 1 and 2. A UV-curing epoxy resin 16 is introduced into the cylinder, through the notch 19, except for the region in the proximity to the light-coupling portion 11 to fit the optical fiber coupler to the cylinder 17. The clamps 4 and 5 are unfastened at this stage and thus the temporary jig comprising the clamps 4 and 5 as well as the threaded bar 22 and the guide bar 23 is detached from the optical fiber coupler.

Figure 6A:
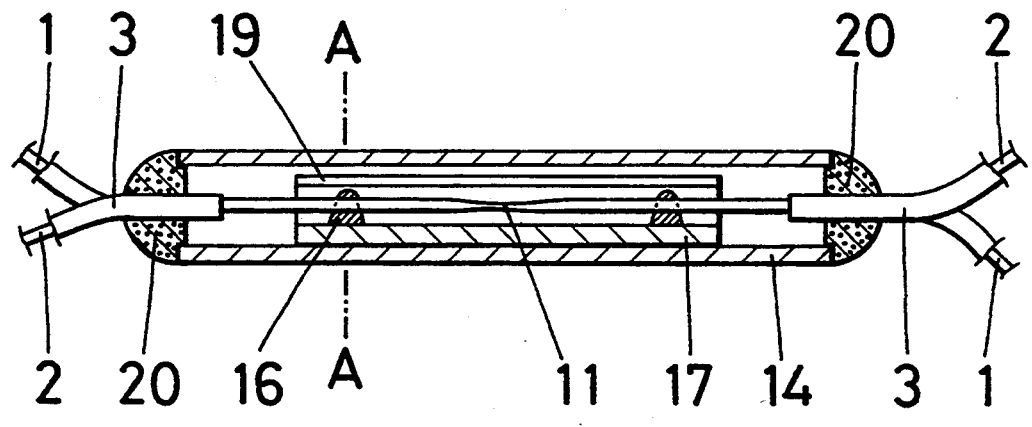
FIGS. 6A and 6B are a sectional side elevation and a vertical sectional view showing another embodiment of the optical fiber coupler produced according to the method of the present invention, respectively.
Figure 6B:
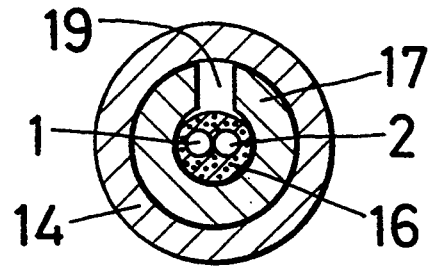

The optical fiber coupler fixed to the cylinder 17 through adhesion in this manner is inserted into a cylindrical protective case 14 as shown in FIG. 6A, then the cylinder 17 is adhered to the protective case 14 and further the bundle of the optical fibers 1 and 2 are fixed to the case 14 through adhesion with an adhesive 20 at both ends of the case 14 to thus complete an optical fiber coupler.

It was confirmed that the optical fiber coupler shown in FIG. 6A and completed according to the foregoing processes exhibited desired performance. More specifically, the optical fiber coupler was completed by controlling the branching ratio during the fusion and drawing step shown in FIG. 2 to 1:1 and treating according to the processes shown in FIGS. 5 and 6, then the branching ratio of the optical fiber coupler was determined. As a result, the difference between the branching ratios thereof determined immediately after the fusion and drawing and determined at this stage was found to be 4.7% on the average. Moreover, the optical fiber coupler used in the determination of the branching ratio was again inspected for the branching ratio after the coupler was subjected to a thermal shock test. As a result, the difference between the branching ratios of the coupler thus determined and determined immediately after the fusion and drawing operation was found to be 1.9% on the average. The foregoing results clearly indicate that the optical fiber coupler produced according to the processes shown in FIGS. 2, 5 and 6 exhibits the difference between the branching ratios of the coupler determined immediately after the fusion and drawing operation and determined after accommodation thereof in the protective case 14 and the subsequent adhesion thereto on the order of not more than 5% and that the difference in branching ratios is reduced to a level on the order of not more than 2% after the coupler is subjected to a thermal shock test.

By way of comparison, an optical fiber coupler was produced by adjusting the branching ratio in the fusion and drawing process shown in FIG. 2 to 1:1, unfastening the clamps 4 and 5 without fixing the relative positions of the optical fibers 1 and 2, gently putting it on the hemi-circular fixing stand 15, then adhering the optical fibers 1 and 2, except for the light-coupling portion 11, to the stand and accommodating the coupler in the protective case 14 and fixing it to the case. Thereafter, the branching ratio of the resulting optical coupler was determined. As a result, it was found that the difference between the branching ratios of the coupler determined immediately after the fusion and drawing operation and thus determined after accommodation thereof in the protective case 14 and the subsequent adhesion thereto was on the order of 8.7% on the average and that the difference in branching ratios was on the order of 4.9% on the average after the coupler was subjected to a thermal shock test.

As has been described above in detail, the optical fiber coupler according to the present invention exhibits the difference between the branching ratios thereof determined immediately after the fusion and drawing operation and determined after accommodation thereof in the protective case and the subsequent adhesion thereto on the order of not more than 5% and accordingly, the difference in branching ratios thereof is reduced to a level on the order of not more than 2% after the coupler is subjected to a thermal shock test. This clearly indicates that the coupler never causes any substantial change in properties even after subjecting it to a thermal shock test and thus can practically be used with high reliability.

Moreover, in the method for producing an optical fiber coupler according to the present invention, a bundle of optical fibers is fused and drawn to give a light-coupling portion, immediately thereafter the relative positions of the optical fibers are fixed and then the resulting coupler is accommodated in a protective case and fixed thereto. For this reason, the method permits the production of an optical fiber coupler which never causes any substantial change in properties even after subjecting it to a thermal shock test and which can provide high reliability upon practical use.

What is claimed is:

1. An optical fiber coupler comprising a plurality of optical fibers bundled together and a light-coupling portion which is formed by partially fusing and drawing these bundled fibers and which permits branching of light rays incident upon one of these fibers into the other fibers at a predetermined branching ratio, wherein the optical fiber coupler has a difference between the branching ratio thereof determined immediately after the fusion and drawing operation and that determined after accommodating the coupler in a protective container and then adhering it to the case, equal to or less than 5%.

2. A method for producing an optical fiber coupler which comprises the steps of bundling a plurality of optical fibers, optically coupling a part of the bundled optical fibers by fusing and drawing a part thereof with heating and accommodating the product thus obtained in a protective case, wherein the relative positions of these optical fibers are fixed immediately after the fusing and drawing operation and then the optical fiber coupler thus fixed is accommodated in the protective case, said optical fiber coupler having a difference between the branching ratio thereof determined immediately after the fusion and drawing operation and that determined after accommodating the coupler in a protective container and then adhering it to the case, equal to or less than 5%.

3. The method as set forth in claim 2 wherein the fixation of the relative positions of these optical fibers is carried out by adhering each optical fiber to a fixing member with an adhesive and then the resulting assembly inclusive of the fixing member is accommodated in the protective case.

4. The method as set forth in claim 3 wherein the adhesive is a UV-curing epoxy resin.

5. The method as set forth in claim 2 wherein the fixation of the relative positions of these optical fibers is carried out by accommodating the optical fibers in the protective case while fixing these optical fibers to temporary jigs, then adhering these fibers to the protective case with an adhesive and then unfastening the jigs.

6. The method as set forth in claim 5 wherein the adhesive is a UV-curing epoxy resin.

* * * * *